United States Patent
Wang et al.

(10) Patent No.: US 8,040,453 B2
(45) Date of Patent: Oct. 18, 2011

(54) PIXEL MODULE AND DISPLAY DEVICE UTILIZING THE SAME

(75) Inventors: Yeong-Feng Wang, Taoyuan County (TW); Chih-Liang Liao, Taoyuan County (TW); Tien-Chun Huang, Taoyuan County (TW); Yi-Wei Lee, Taoyuan County (TW)

(73) Assignee: Au Optronics Corp., Hsin-Chu (TW)

( * ) Notice: Subject to any disclaimer, the term of this patent is extended or adjusted under 35 U.S.C. 154(b) by 1238 days.

(21) Appl. No.: 11/692,230

(22) Filed: Mar. 28, 2007

(65) Prior Publication Data

US 2008/0158463 A1 Jul. 3, 2008

(30) Foreign Application Priority Data

Dec. 27, 2006 (TW) .............................. 95149192 A

(51) Int. Cl.
G02F 1/136 (2006.01)
(52) U.S. Cl. ........................................... 349/48; 349/42
(58) Field of Classification Search ................... 349/42, 349/48
See application file for complete search history.

(56) References Cited

U.S. PATENT DOCUMENTS

| | | | | |
|---|---|---|---|---|
| 6,100,948 A * | 8/2000 | Kim et al. | ........................ | 349/39 |
| 6,822,701 B1 * | 11/2004 | Kasahara et al. | ................ | 349/38 |
| 6,888,589 B2 * | 5/2005 | Kim et al. | ........................ | 349/54 |
| 6,975,295 B2 * | 12/2005 | Hashimoto et al. | .............. | 345/87 |
| 7,098,981 B2 * | 8/2006 | Nakayoshi et al. | ............ | 349/141 |
| 7,339,564 B2 * | 3/2008 | Hashimoto et al. | .............. | 345/87 |
| 2003/0038917 A1 * | 2/2003 | Song et al. | ..................... | 349/192 |
| 2004/0001176 A1 * | 1/2004 | Kim et al. | ..................... | 349/139 |
| 2004/0046917 A1 * | 3/2004 | Nakayoshi et al. | ............ | 349/141 |
| 2004/0090566 A1 * | 5/2004 | Jung et al. | ........................ | 349/43 |
| 2004/0246395 A1 | 12/2004 | Chang | | |
| 2005/0285989 A1 * | 12/2005 | Sakurai et al. | ................... | 349/44 |
| 2006/0033130 A1 * | 2/2006 | Hashimoto et al. | ............ | 257/291 |
| 2007/0159571 A1 * | 7/2007 | Yang | ............................... | 349/54 |

FOREIGN PATENT DOCUMENTS

| | | |
|---|---|---|
| CN | 1758123 | 4/2006 |
| TW | 200428117 | 12/2004 |

OTHER PUBLICATIONS

CN Office Action mailed Apr. 18, 2008.
Taiwanese language office action dated Apr. 29, 2011.
English language translation of abstract of TW 200428117.

* cited by examiner

*Primary Examiner* — K. Cyrus Kianni
*Assistant Examiner* — Kaveh Kianni
(74) *Attorney, Agent, or Firm* — Thomas|Kayden

(57) ABSTRACT

A pixel module comprising a first transistor, a second transistor, and a connection line is disclosed. The first transistor is coupled to a first gate line, a source line, and a first drain line. The second transistor is coupled to a second gate line, the source line, and a second drain line. The connection line overlaps and isolates the first and the second drain lines.

11 Claims, 10 Drawing Sheets

PIXEL MODULE AND DISPLAY DEVICE UTILIZING THE SAME

BACKGROUND OF THE INVENTION

1. Field of the Invention

The disclosure relates to a pixel module, and more particularly to a pixel module having a repairable structure.

2. Description of the Related Art

Liquid crystal displays (LCD) are a commonly used flat panel display technology possessing the advantages of low power consumption, thin profile, and low driving voltage. LCDs are used in a wide variety of applications including, personal computers (PC), word processors, navigation systems, video games, projectors, viewfinders, and portable apparatuses, such as watches, calculators and televisions.

The dielectric and conductive anisotropy of liquid crystal molecules allows the molecular orientation of liquid crystal molecules to be shifted by an external electrical field, thus, various optical effects are produced. Thin film transistors (TFT) serve as the active elements in LCDs as they possess the advantages of low power consumption, thin profile, and low driving voltage.

FIG. 1 is a schematic diagram of a conventional display panel. For clarity, the conventional display panel 10 only shows two pixel units 11 and 12. The pixel unit 11 comprises a transistor 111 and a pixel capacitor 112. A scan electrode provides a scan signal $S_1$ for turning on the transistor 111. A data electrode provides a video signal $D_1$ to the transistor 111 for charging the pixel capacitor 112. The liquid crystal molecules of the pixel unit 11 are rotated according to a voltage stored in the pixel capacitor 112 such that light passes through the pixel unit 11.

The pixel unit 12 comprises a transistor 121 and a pixel capacitor 122. A scan electrode provides a scan signal $S_2$ for turning on the transistor 121. A data electrode provides a video signal $D_1$ to the transistor 121 for charging the pixel capacitor 122. The liquid crystal molecules of the pixel unit 12 are rotated according to voltage stored in the pixel capacitor 122 such that light passes through the pixel unit 12.

When the transistors 111 and 121 are normal, the pixel capacitors 112 and 122 are charged according to the video signal $D_1$. When the transistors 111 and 121 are abnormal, the video signal $D_1$ is unable to charge the pixel capacitors 112 and 122 via the transistors 111 and 121. Thus, liquid crystal components of the pixel units 11 and 12 do not rotate such that light cannot pass through the pixel units 11 and 12.

BRIEF SUMMARY OF THE INVENTION

The pixel modules are provided. An embodiment of a pixel module comprises a first transistor, a second transistor, and a connection line. The first transistor is coupled to a first gate line, a source line, and a first drain line. The second transistor is coupled to a second gate line, the source line, and a second drain line. The connection line is overlapped and insulated from the first and the second drain lines.

Another embodiment of the pixel module having a repairable structure comprises a first transistor, a second transistor, and a connection line. The first transistor is coupled to a first gate line, a source line, and a first drain line to drive a first pixel. The second transistor is coupled to a second gate line, the source line, and a second drain line to drive a second pixel. The connection line is overlapped and insulated from the first and the second drain lines. When the first transistor is unable to drive the first pixel, a connection between the first drain line and the first transistor is cut off and the first drain line electrically connects to the second drain line via the connection line.

Display devices are also provided. An embodiment of a display device comprises a scan driver, a data driver, and a pixel module. The scan driver provides a plurality of scan signals. The data driver provides a plurality of the video signals. The pixel module comprises a first transistor, a second transistor, and a connection line. The first transistor is coupled to a first gate line for receiving the corresponding scan signal, a source line, and a first drain line for receiving the corresponding video signal. The second transistor is coupled to a second gate line for receiving the corresponding scan signal, the source line, and a second drain line for receiving the corresponding video signal. The connection line is overlapped and insulated from the first and the second drain lines.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
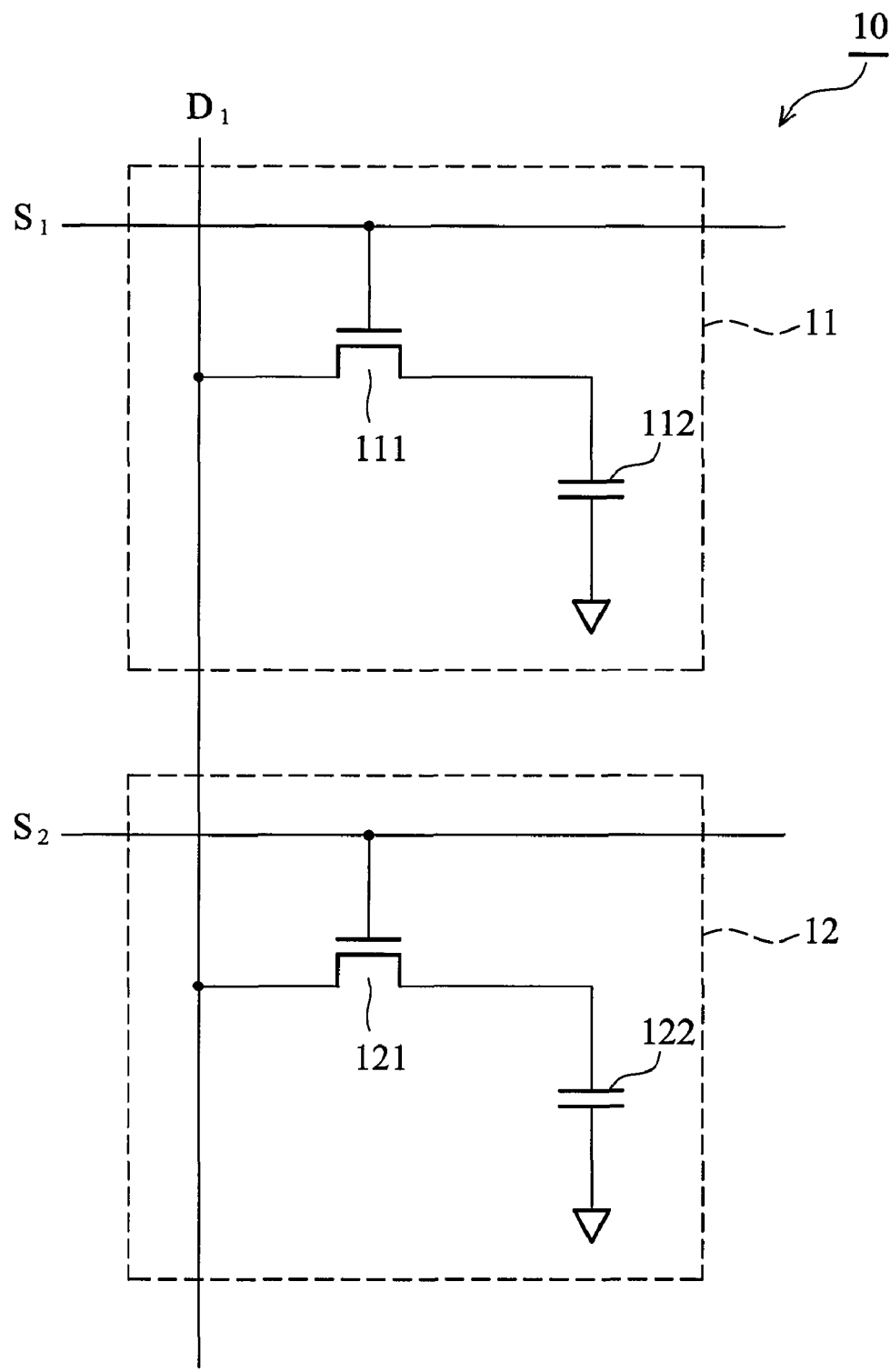
FIG. 1 is a schematic diagram of a conventional display panel.
Figure 2:
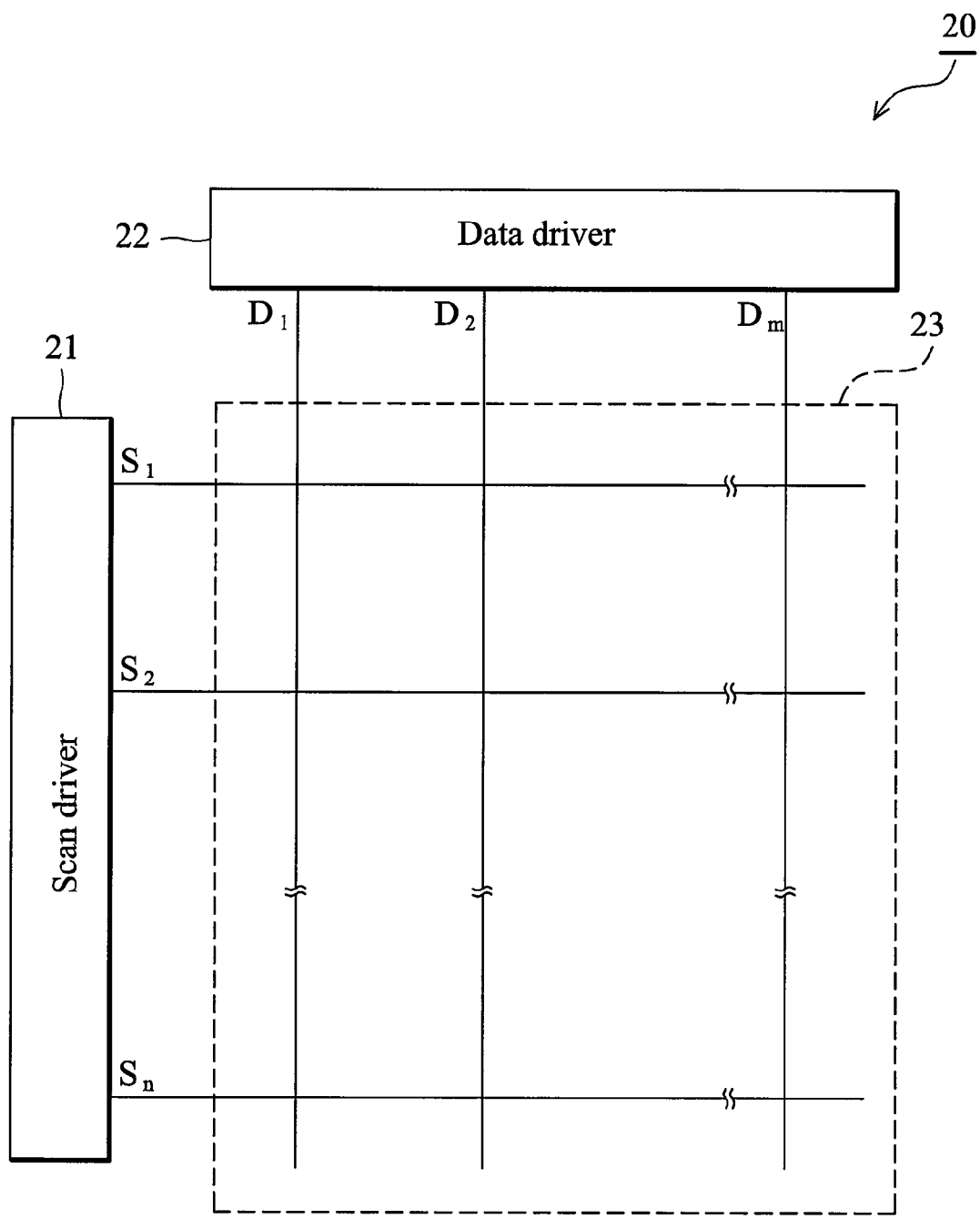
FIG. 2 is a schematic diagram of an embodiment of a display device.

FIG. 2 is a schematic diagram of an embodiment of a display device. The display device 20 comprises a scan driver 21, a data driver 22, and a pixel module 23. The scan driver 21 provides scan signals $S_1$~$S_n$. The data driver 22 provides video signals $D_1$~$D_m$. The pixel module 23 displays image according to the scan signals $S_1$~$S_n$ and the video signals $D_1$~$D_m$.

Figure 3A:
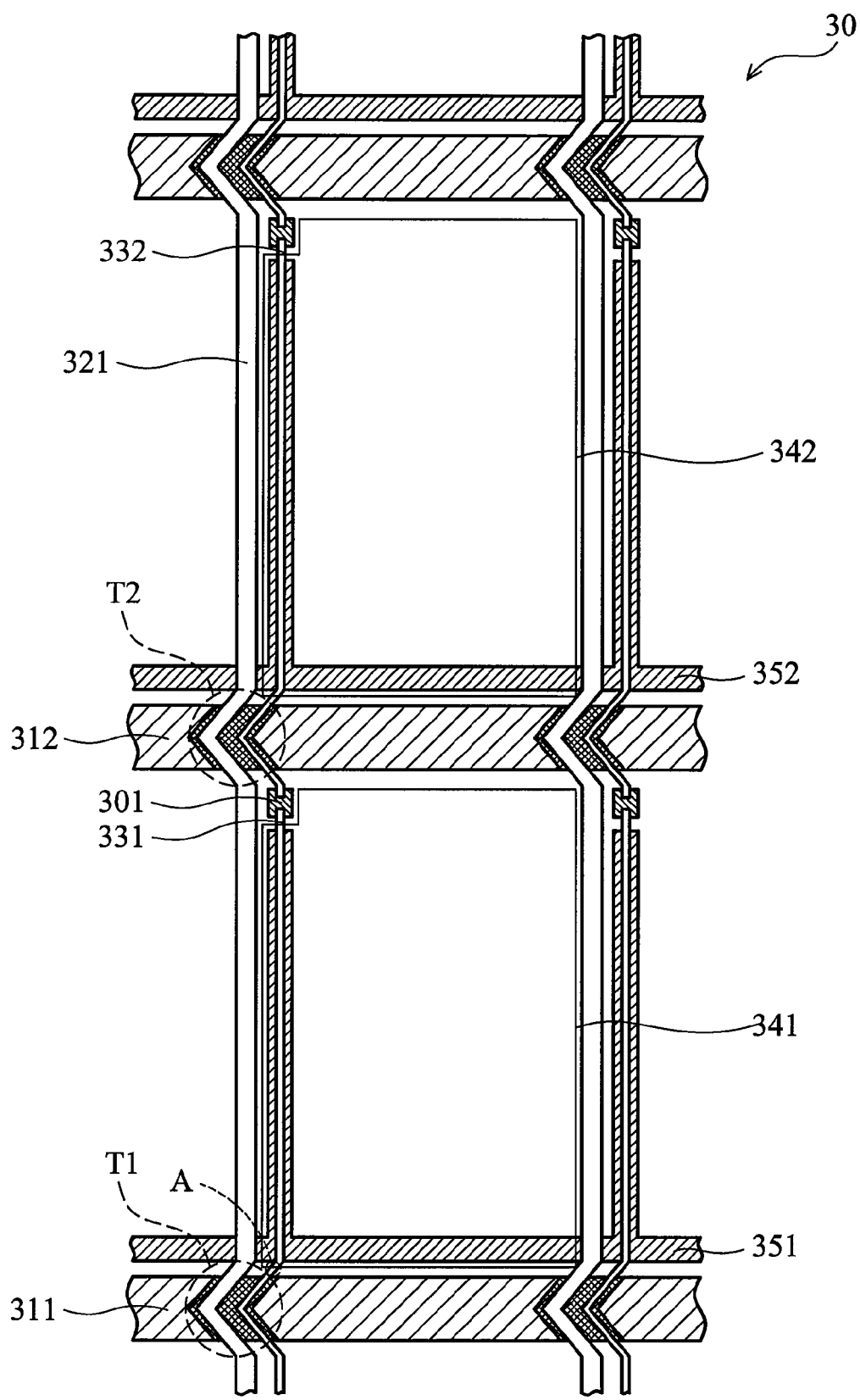
FIG. 3a is a schematic diagram of an embodiment of a pixel module.

FIG. 3a is a schematic diagram of an embodiment of a pixel module. For clarity, the pixel module shown in FIG. 3a only comprises two pixel units. The pixel module 30 comprises two transistors T1, T2, and a connection line 301.

The transistor T1 is coupled to a gate line 311, a source line 321, and a drain line 331. The source line 321 and the drain line 331 are parallel at a side of one pixel unit. A pixel electrode is disposed in a region 341. When the pixel electrode overlaps a common line 351, an auxiliary capacitor is formed between the pixel electrode and common line 351. The transistor T1 controls one pixel unit and a pixel capacitor of the pixel unit controlled by the transistor T1.

The transistor T2 is coupled to a gate line 312, a source line 321, and a drain line 332. The source line 321 and the drain line 332 are parallel at a side of another pixel unit. The drain lines 332 and 331 are unconnected. A pixel electrode is disposed in a region 342. When the pixel electrode overlaps a common line 352, an auxiliary capacitor is formed between the pixel electrode and the common line 352. The transistor T2 controls another pixel unit and a pixel capacitor of the pixel unit controlled by the transistor T2.

The connection line 301 is overlapped and insulated from the drain lines 331 and 332. The connection line 301 and gate lines 311 and 312 are formed by the same metal layer. In some embodiments, connection line 301 is formed by a metal layer and gate lines 311, 312 are formed by another metal layer.

The gate line 311 receives a corresponding scan signal and the gate line 312 receives another corresponding scan signal. The source line 321 receives a corresponding video signal. The drain lines 331 and 332 respectively charge the corresponding pixels according to the video signals.

The efficiency of pixel module 30 is influenced by an area overlapped by the drain line 331 and the gate line 311 and another area overlapped by the drain line 332 and the gate line 312. An RC delay is caused by a parasitic capacitor formed between a source line and a gate line or formed between a drain line and a gate line. Thus, a region overlapped by the source line and the gate line is required to be smaller. Similarly, a region overlapped by the source line and the gate line is also required to be smaller.

In this embodiment, the drain line 331 traverses the gate line 311 symmetrically and crookedly for maintaining an overlapping area between the drain line 331 and gate line 311. The drain line 332 traverses the gate line 312 symmetrically and crookedly for maintaining an overlapping area between the drain line 332 and gate line 312. Additionally, the source line 321 traverses the gate lines 311 and 312 symmetrically and crookedly. When an alignment error occurs in a vertical direction, the overlapping area between the drain line 331 and the gate line 311, and the overlapping area between the drain line 332 and the gate line 312 are not affected.

When the widths of a source line and a drain line are greater, a transistor, coupled to the source and the drain lines charges faster. Additionally, if a distance between the source and the drain lines is shorter, transistor charges faster.

Figure 3B:
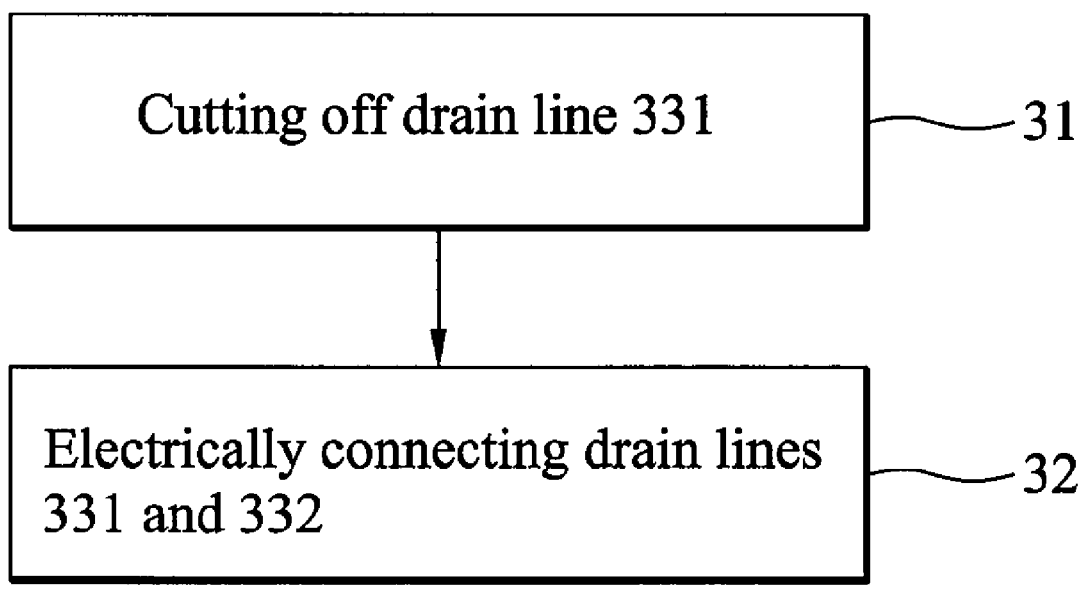
FIG. 3b is a flowchart of an embodiment of a repair method applied in the pixel module.

FIG. 3b is a flowchart of an embodiment of a repair method applied in the pixel module. With reference to FIG. 3a, if the transistor T1 is abnormal, the corresponding pixel capacitor is unable to store perfect charges. Thus, a laser is utilized to cut off drain line 331 (step 31) such that the transistor T1 is not able to control the corresponding pixel capacitor. In this embodiment, the drain line 331 in a region A is cut off The laser can be a YAG laser, a ruby laser, or a $CO_2$ laser.

Next, the laser is again utilized for electrically connecting the drain lines 331 and 332 by the connection line 301 (step 32). Since the connection line 301 overlaps the drain lines of adjacent transistors, when the transistor T1 is abnormal, the corresponding pixel capacitor is controlled by the transistor T2. Since the drain line 331 electrically connects the drain line 332, the pixel capacitors of two pixel units stores the same charges.

Figure 4:
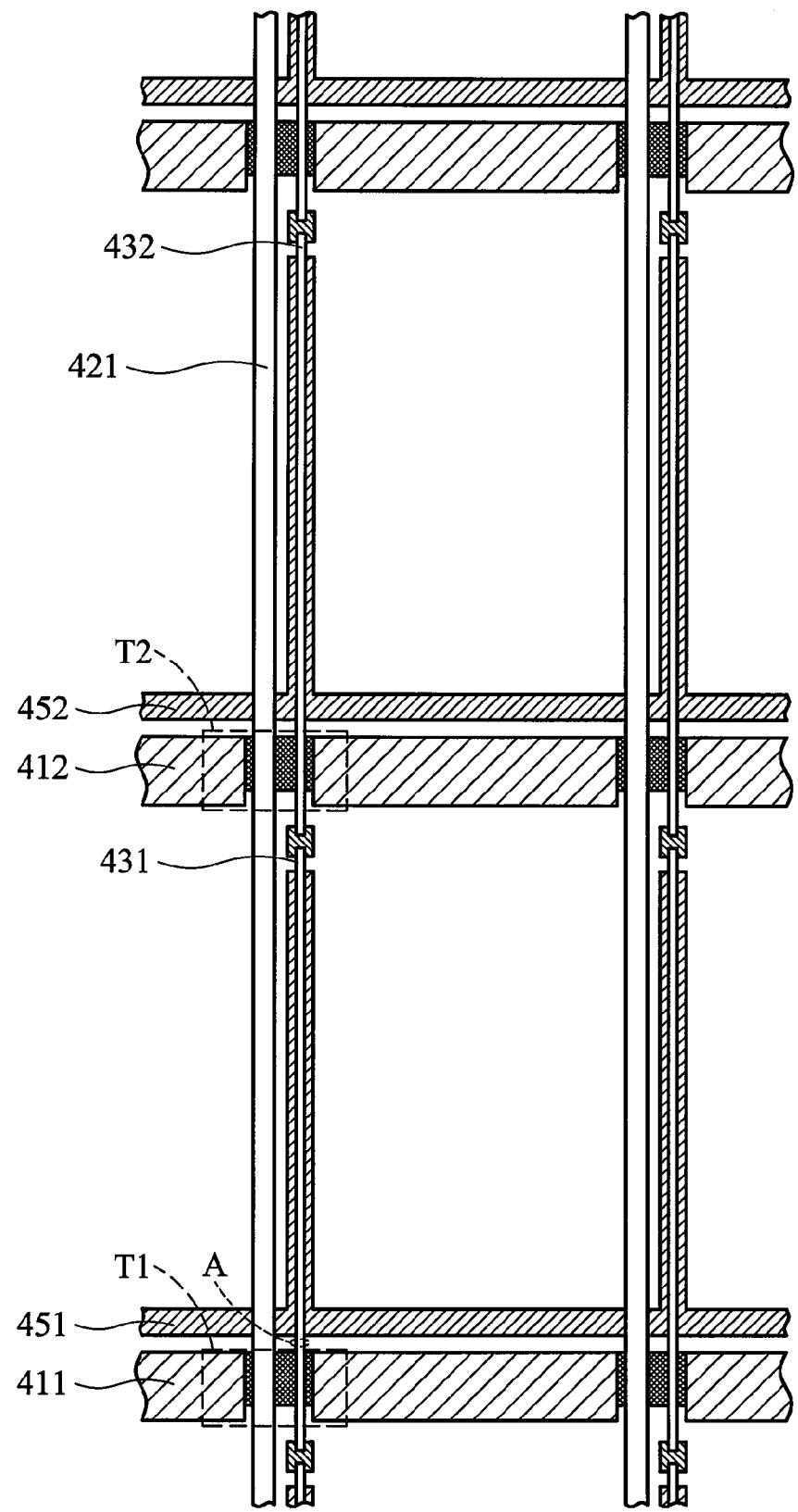
FIGS. 4~9 are schematic diagrams of the other embodiments of the pixel module.

FIGS. 4~9 are schematic diagrams of the other embodiments of the pixel module. Pixel electrodes are well known to those skilled in the art, thus, for brevity, FIGS. 4~9 do not show pixel electrodes. As shown in FIG. 4, a source 421 traverses the gate lines 411 and 412 straight. A drain line 431 traverses the gate line 411 straight for maintaining an overlapping area between the drain line 431 and gate line 411. The Drain line 432 traverses gate line 412 straight for maintaining an overlapping area between the drain line 432 and gate line 412. A distance between the source line 421 and the drain line 431, and a distance between the source line 421 and the drain line 432 are fixed. A common line 451 overlaps a portion of the drain line 431. Common line 452 overlaps a portion of the drain line 432.

Figure 5:
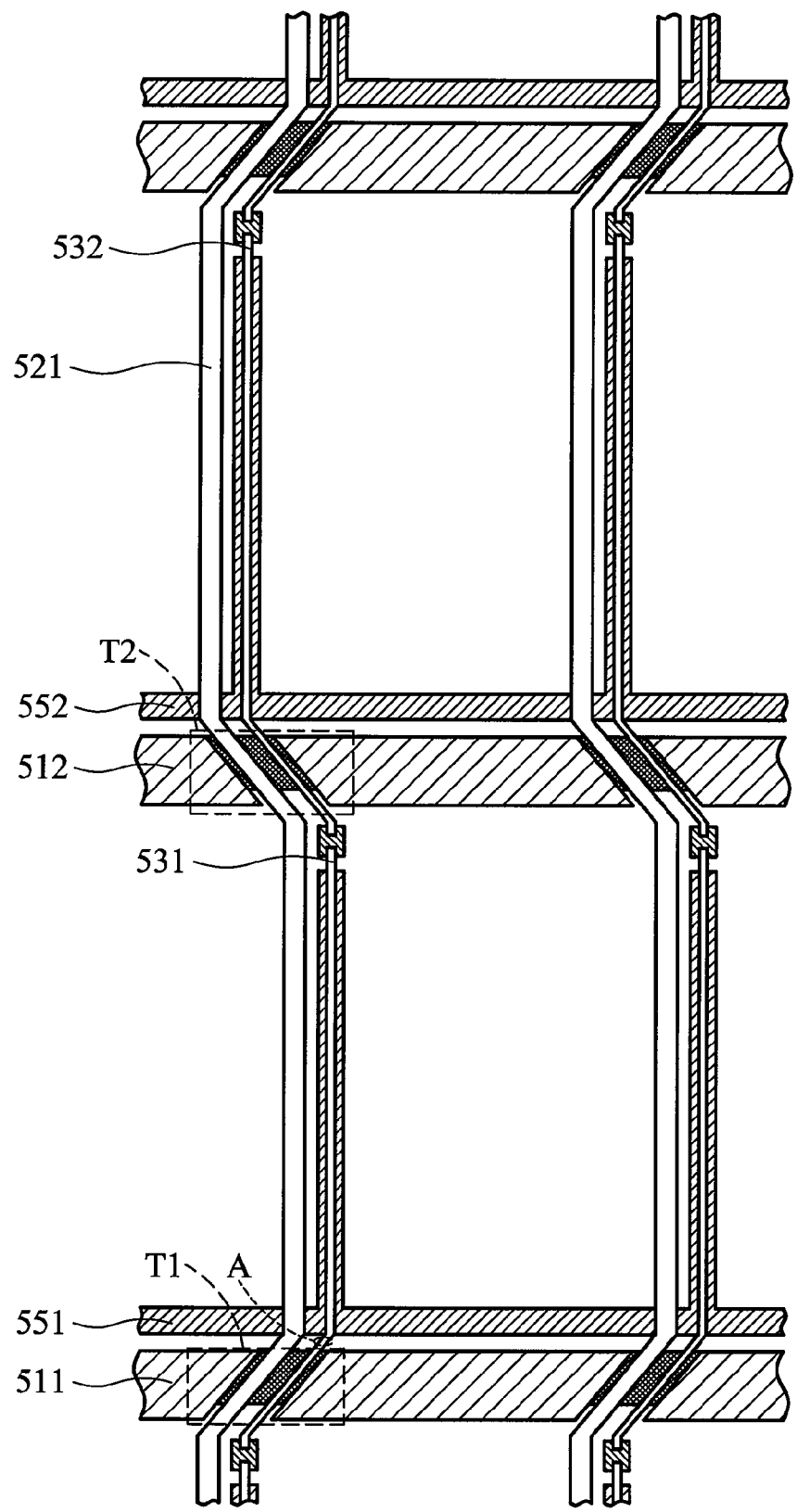

As shown in FIG. 5, the source line 521 traverses gate lines 511 and 512 slantwise. A drain line 531 traverses a gate line 511 slantwise. A drain line 532 traverses a gate line 512 slantwise. A distance between source line 521 and drain line 531, and a distance between source line 521 and drain line 532 are fixed. Common line 551 overlaps drain line 531. A common line 552 overlaps drain line 532.

Figure 6:
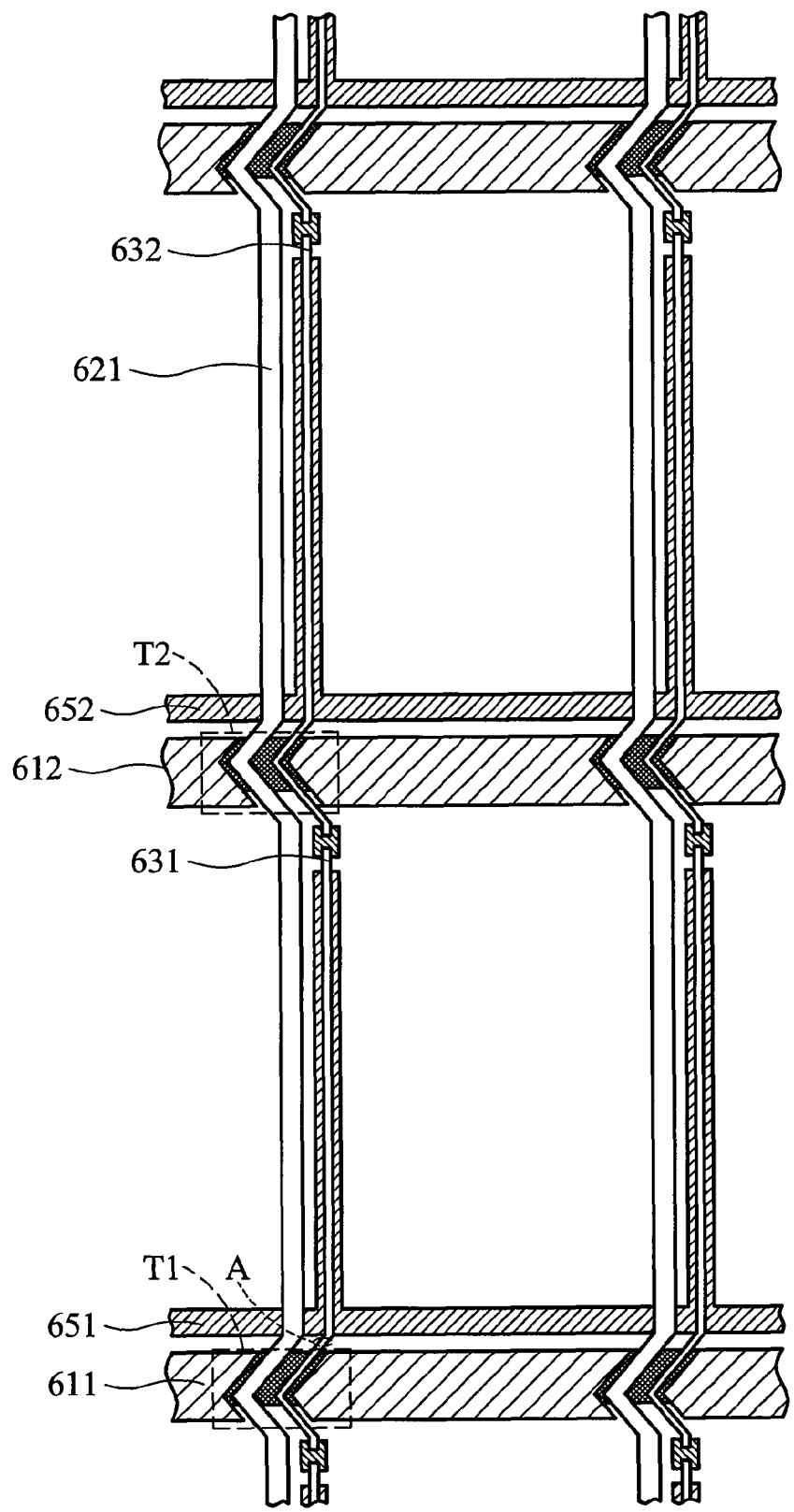

As shown in FIG. 6, a source line 621 traverses gate lines 611 and 612 non-symmetrically and crookedly. A drain line 631 traverses the gate line 611 non-symmetrically and crookedly for maintaining an overlapping area between the drain line 631 and gate line 611. A drain line 632 traverses the gate line 612 non-symmetrically and crookedly for maintaining an overlapping area between the drain line 632 and gate line 612. A distance between source line 621 and drain line 631, and a distance between source line 621 and drain line 632 are fixed. A common line 651 overlaps a portion of the drain line 631. A common line 652 overlaps a portion of the drain line 632.

Figure 7:
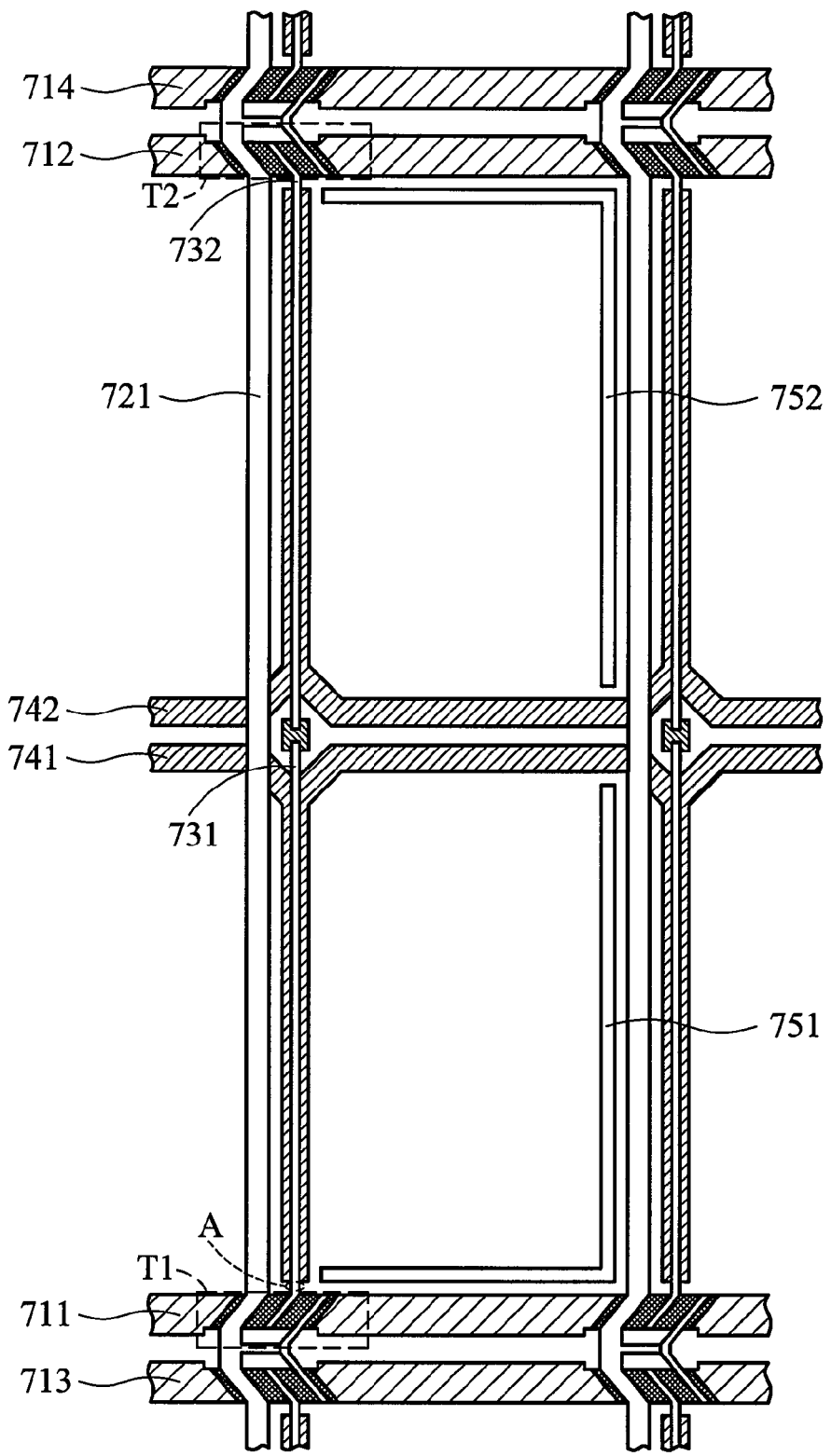

As shown in FIG. 7, a source line 721 traverses gate lines 711 and 712 slantwise. A drain line 731 traverses the gate line 711 slantwise. A drain line 732 traverses the gate line 712 slantwise. In this embodiment, two source lines are collocated with one drain line disposed between two source lines such that the channel width of a transistor coupled to the source lines and the drain line is increased. When the locations of gate lines 711~714 and common lines 741 and 742 change, the color contrast of the pixel module is increased. In this embodiment, gate lines 711~714 and common lines 741 and 742 are parallel. Gate lines 712 and 714 are disposed at the top of a pixel unit and common lines 741 and 742 are disposed at the bottom of the pixel unit. Additionally, common lines 741 and 742 are disposed at the top of another pixel unit and gate lines 711 and 713 are disposed at the bottom of another pixel unit. A connection line is disposed between two adjacent common lines for repairing adjacent pixel units.

Figure 8:
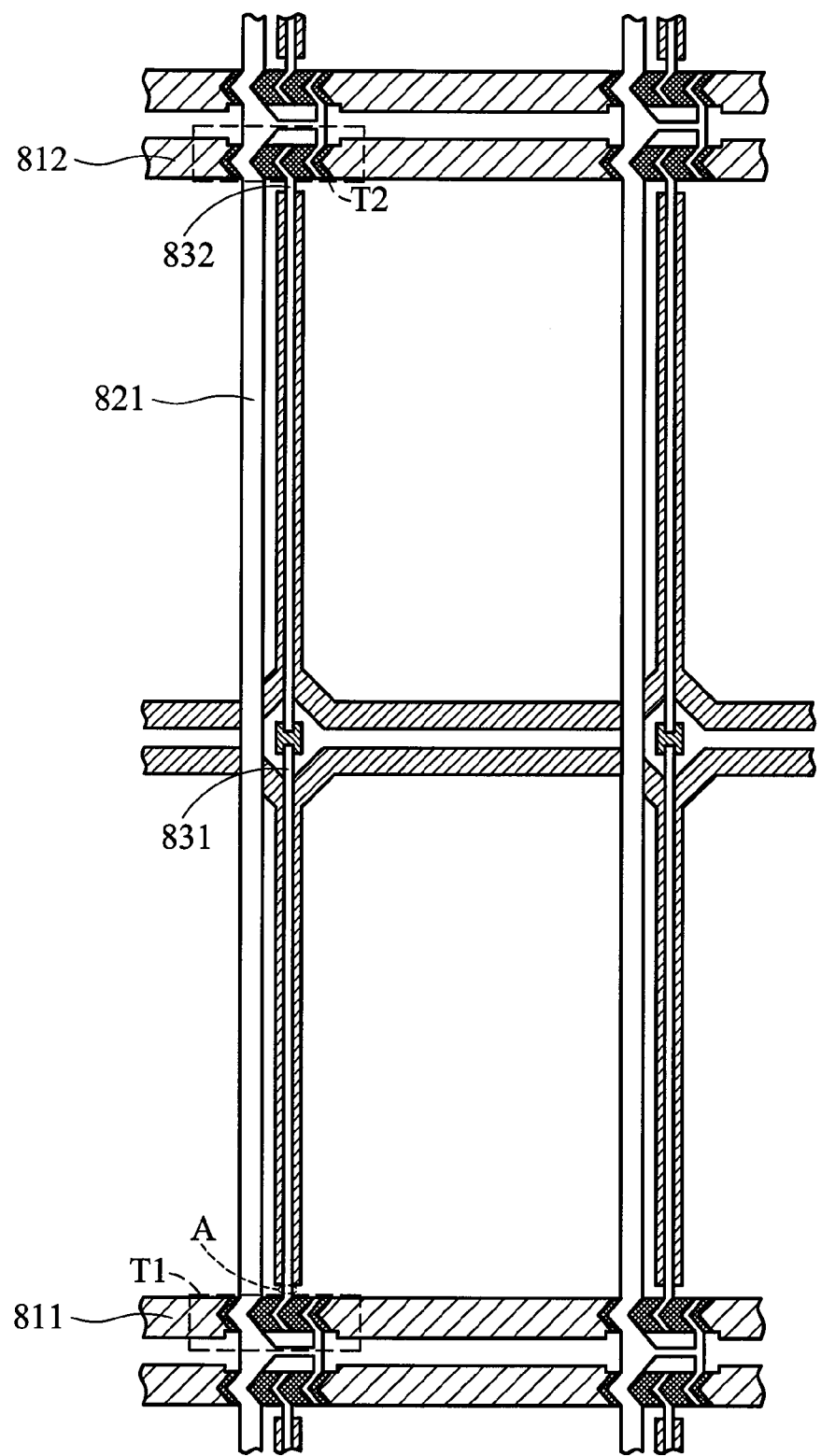
Figure 9:
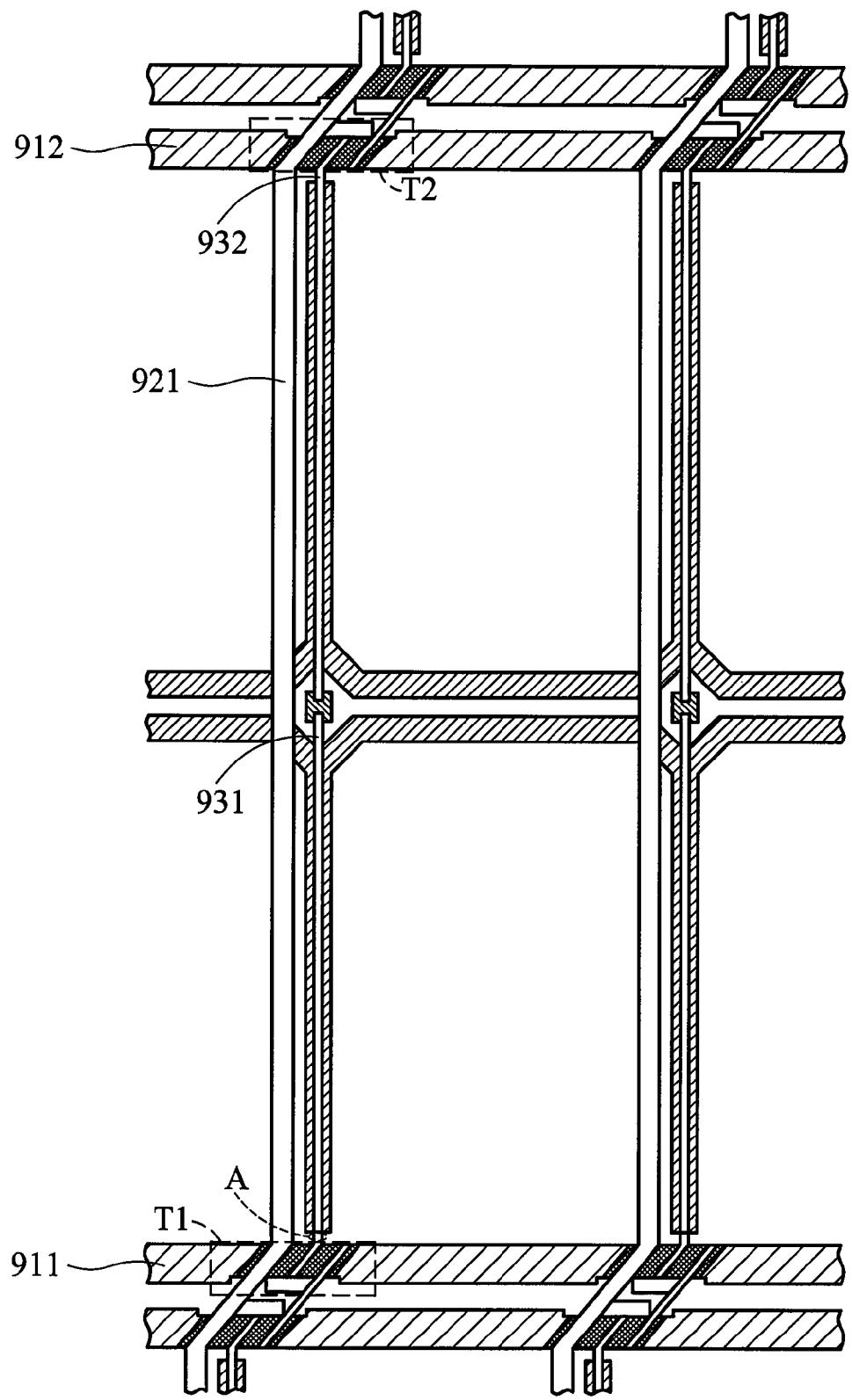

As shown in FIG. 8, a source line 821 traverses gate lines 811 and 812 crookedly. A drain line 831 traverses gate line 811 crookedly for maintaining an overlapping area between the drain line 831 and gate line 811. Drain line 832 traverses gate line 812 crookedly for maintaining an overlapping area between the drain line 832 and gate line 812. A distance between source line 821 and drain line 831, and a distance between source line 821 and drain line 832 are fixed. As shown in FIG. 9, source line 921 traverses gate lines 911 and 912 slantwise. A drain line 931 traverses gate line 911 slantwise for maintaining an overlapping area between the drain line 931 and gate line 911. A drain line 932 traverses gate line 912 slantwise for maintaining an overlapping area between the drain line 932 and gate line 912.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pixel module, comprising:
   a first transistor coupled to a first gate line, a source line, and a first drain line;
   a second transistor coupled to a second gate line, the source line, and a second drain line, wherein the first drain line and the second drain line are unconnected;

a connection line overlapping and insulating from the first and the second drain lines;

a first pixel electrode corresponding to the first transistor; and a second pixel electrode corresponding to the second transistor;

wherein the source line and the first drain line are parallel and extended fully at a side of the first pixel electrode, and the source line and the second drain line are parallel and extended fully at a side of the second pixel electrode.

2. The pixel module as claimed in claim 1, wherein the first drain line traverses the first gate line and the second drain line traverses the second gate line.

3. The pixel module as claimed in claim 2, wherein the first drain line traverses the first gate line straight.

4. The pixel module as claimed in claim 2, wherein the first drain line traverses the first gate line slantwise.

5. The pixel module as claimed in claim 2, wherein the first drain line traverses the first gate line crookedly.

6. The pixel module as claimed in claim 2, wherein a distance between the first source and the first drain lines is a constant.

7. The pixel module as claimed in claim 1, wherein the connection line and the first and the second gate lines are formed by the same metal layer.

8. The pixel module as claimed in claim 1, wherein the connection line is formed by a metal layer and the first and the second gate lines are formed by another metal layer.

9. The pixel module as claimed in claim 1, wherein the source line traverses the first and the second gate lines.

10. The pixel module as claimed in claim 1, wherein the first drain line is disconnected from the first transistor and the first, the second drain lines and the connection line are electrically connected by a laser when the first transistor is abnormal.

11. The pixel module as claimed in claim 10, wherein the laser is a YAG laser, a ruby laser, or a $CO_2$ laser.

* * * * *